United States Patent
Garbagnati et al.

(10) Patent No.: US 7,222,730 B2
(45) Date of Patent: May 29, 2007

(54) CONVEYOR WITH NONSKID SUPPORT SURFACE AND MANUFACTURING METHOD FOR SAME

(75) Inventors: Carlo Garbagnati, Castello Brianza (IT); Norberto Cattaneo, Usmate-Velate (IT)

(73) Assignee: Regina SUD S.p.A., Borgo San Michele LT (IT)

( * ) Notice: Subject to any disclaimer, the term of this patent is extended or adjusted under 35 U.S.C. 154(b) by 218 days.

(21) Appl. No.: 11/106,510

(22) Filed: Apr. 15, 2005

(65) Prior Publication Data

US 2005/0241923 A1 Nov. 3, 2005

(30) Foreign Application Priority Data

May 3, 2004 (IT) .......................... MI2004A0881

(51) Int. Cl.
*B65G 17/38* (2006.01)
(52) U.S. Cl. ..................................... 198/853
(58) Field of Classification Search ............... 198/850, 198/851, 852, 853; 425/547, 28.1, 40, DIG. 108
See application file for complete search history.

(56) References Cited

U.S. PATENT DOCUMENTS 5,507,383 A * 4/1996 Lapyere et al. ............. 198/853
6,986,420 B2 * 1/2006 Weiser et al. ............... 198/853
2001/0052451 A1 * 12/2001 Ruoss et al. ................ 198/853

FOREIGN PATENT DOCUMENTS

EP 0523810 A1 1/1993

* cited by examiner

*Primary Examiner*—James R. Bidwell
(74) *Attorney, Agent, or Firm*—Jacobson Holman PLLC

(57) ABSTRACT

Method for manufacture of links designed to be interconnected to form a conveyor and including the following steps;
- mold a body of the link of rigid low-friction material with said body being provided with projections protruding from one of its faces, and
- hot-mold on at least part of said face cooled to hardening a high-friction malleable material for formation of a skidproof covering with the high-friction material during molding striking said projections and being injected at a temperature higher than the softening temperature of the rigid material in such a manner as to cause plastic deformation of the projections that originate undercuts with the deformed projections upon completed molding remaining incorporated in the high-friction material to create a mechanical interconnection between the covering and the rigid body.

14 Claims, 2 Drawing Sheets

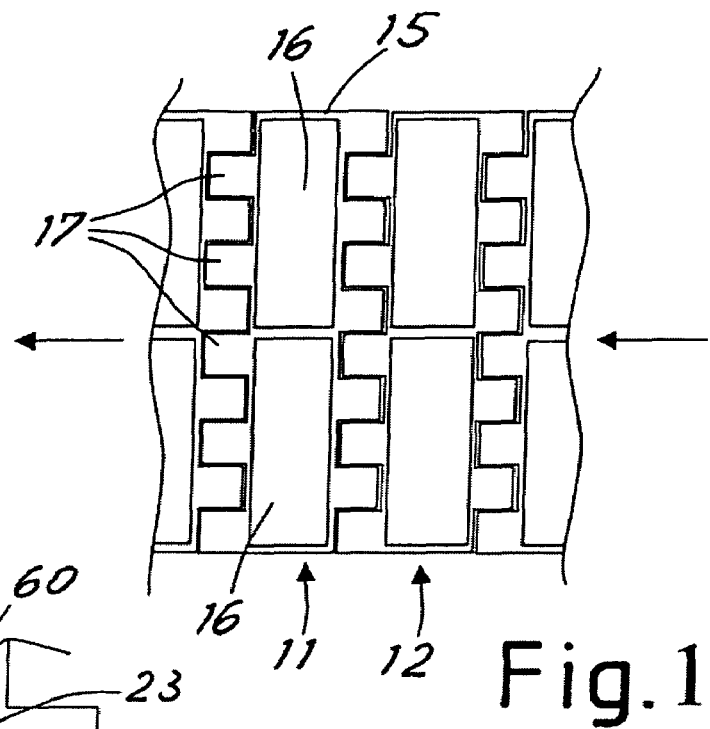
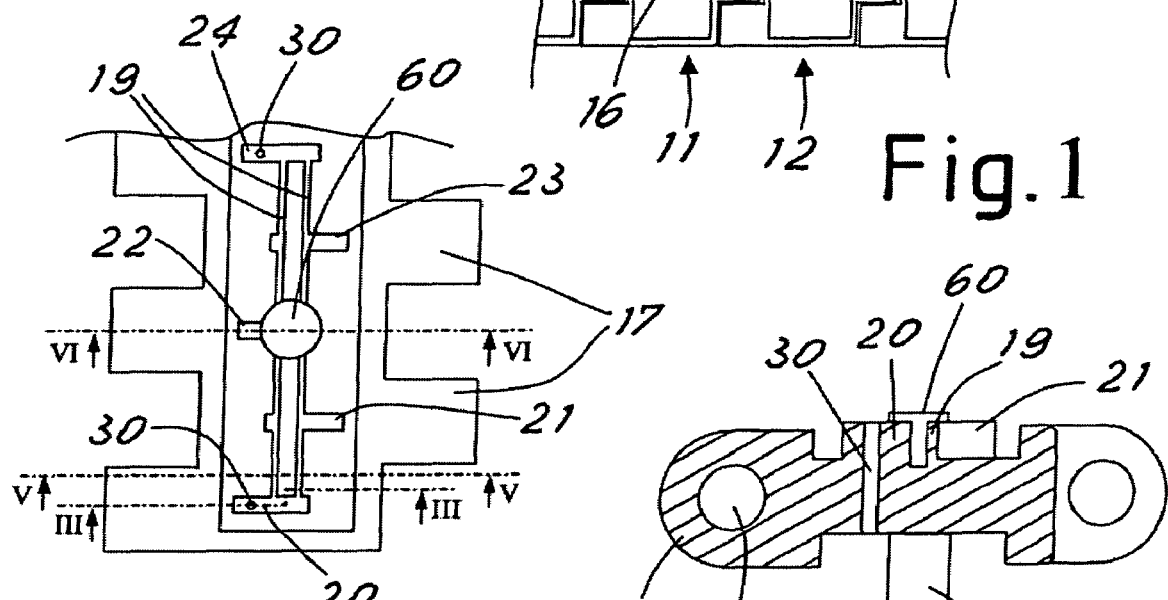
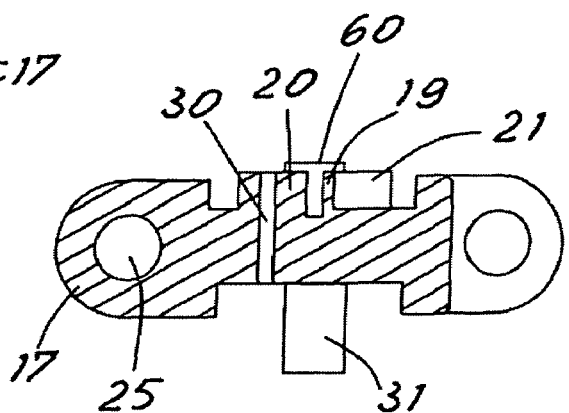
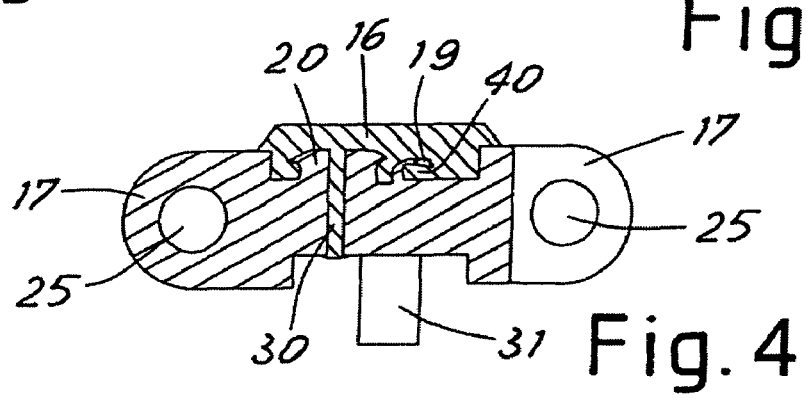

CONVEYOR WITH NONSKID SUPPORT SURFACE AND MANUFACTURING METHOD FOR SAME

BACKGROUND OF THE INVENTION

1. Field of the Invention

This invention relates to a conveyor consisting of an indefinite sequence of interconnected links having a nonskid top surface for support of the objects to be conveyed. This invention also relates to a method for manufacture of the conveyor links.

2. State of the Prior Art

The problem of making conveyor belts or chains suited to running along appropriate guides and that at the same time have a skidproof support surface on which are arranged the objects to be conveyed in the horizontal plane or in a sloped direction relative to said plane has long been known in the conveyor field.

To solve this problem, conveyors consisting of an indefinite sequence of interconnected modular members like chain links to which is applied a covering of malleable skidproof material on the entire surface or partially thereon have been proposed. The members or links are made of rigid thermoplastic material and are provided with undercuts designed to receive in engagement a portion of the malleable material to anchor the skidproof covering to the conveyor belt. For example, in patent No. EP 0 523 810 it is proposed to form a reticulate structure on which is molded the malleable material and that is then fastened to the modular member of the conveyor. The reticulate structure is made of a material suited to being welded (for example with an ultrasonic weld) to the material used to make the modular members making up the conveyor. This solution, while avoiding the use of sophisticated and costly molds for forming the undercuts, implies a sequence of molding and welding steps that make the conveyor manufacturing process slow and uneconomical.

According to the conventional and well known methods of overmolding malleable or thermoplastic materials, it could be thought to hot mold the malleable material forming the covering directly on the rigid link of the conveyor without the latter having undercuts for anchoring the covering. To do this, it is necessary to use malleable material compatible with the rigid material of the linked modular-member body to obtain a link effect by thermal effect. However, the most suitable rigid thermoplastic materials to be used for making the modular members of the conveyors are not generally compatible with the rubbery substances that have good skidproof properties. In addition to this, even with compatibility between the two materials the fastening realized does not ensure satisfactory and safe mechanical resistance so that the skidproof covering could detach itself in the long term from the body of the link during use of the conveyor. It is clear that unreliability of this type is a considerable disadvantage.

In addition, to obtain a strong link with the interface between the two materials it is to be hoped that the surface of the body of the link at least reach softening with resulting alteration of its dimensional characteristic and deterioration of the quality obtained in molding.

The general purpose of this invention is to remedy the above mentioned shortcomings by making available a conveyor having a skidproof surface economical and simple to manufacture.

Another purpose of this invention is to make available a conveyor that would ensure a firm and steady fastening of the skidproof portion to the modular linked members forming the conveyor.

Another purpose of this invention is to make available a method for manufacture of linked members of a conveyor that would be fast and economical.

SUMMARY OF THE INVENTION

In view of this purpose it was sought to provide in accordance with this invention a conveyor including an indefinite sequence of interconnected links with said links including a low-friction body of rigid material to which is applied a covering of more malleable high-friction material to form a supporting surface for the objects conveyed and characterized in that the covering is hot-molded on one face of the rigid body from which protrude projections with said projections covered with high-friction material with melting temperature higher than the softening temperature of the rigid material being deformed irregularly to form undercut members that are incorporated by the high-friction material to create a mechanical interconnection between the covering and the rigid body of the link.

Again in accordance with this invention it was sought to realize for manufacture of links designed to be interconnected to form a conveyor a method including the following steps:

mold a body of the link of rigid low-friction material with said body being provided with projections protruding from one of its faces, and hot mold on at least part of said face cooled to hardening a malleable material with high friction for formation of a skidproof covering with the high-friction material during molding striking said projections and being injected at a higher temperature than the softening temperature of the rigid material in such a manner as to cause plastic deformation of the projections that originate undercuts with the deformed projections upon completed molding remaining incorporated in the high-friction material to create a mechanical interconnection between the covering and the rigid body.

BRIEF DESCRIPTION OF THE DRAWINGS

To clarify the explanation of the innovative principles of this invention and its advantages compared with the prior art there is described below with the aid of the annexed drawings a possible embodiment thereof by way of non-limiting example applying said principles. In the drawings:

FIG. 1 shows a top view of a portion of a conveyor in accordance with this invention, FIG. 2 shows a partial view of a modular member of the conveyor of FIG. 1 before application of the layer of skidproof material, FIG. 3 shows a view of the modular member cross-sectioned along surface III—III of FIG. 2 before the layer of skidproof material is molded, FIG. 4 shows the cross-section of FIG. 3 after molding of the layer of skidproof material.

DETAILED DESCRIPTION OF THE INVENTION

Figure 5:
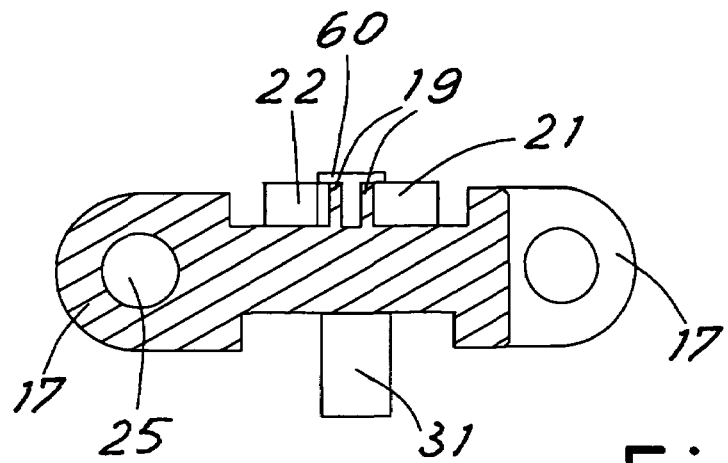
FIG. 5 shows a cross-section view of the link along plane of cut V—V of FIG. 2 before molding of the skidproof covering.

With reference to the figures, FIG. 1 shows a section of a conveyor including a series of modular linked members 11, 12 mutually interconnected to form a conveyor belt designed to move in the direction indicated by the arrows along a purposeful guide (not shown in the figure).

The member (or link) 11 includes a rigid body 15 designed to run on the guide that identifies the conveyor belt path. The rigid body 15 forms the interconnection arms 17 between adjacent modular members. These arms 17 have a hole designed to receive a horizontal pin (not shown) that interconnects the modular members to allow them to rotate mutually in accordance with prior art solutions.

The rigid body 15 of the link is realized from rigid low-friction materials (for example, thermoplastic resins) to favor the non-deformability and running of the conveyor belt on the associated guides and allow dragging engagement, for example opposite the toothed wheels in the conveyor system for dragging of the belt.

On the upper part of the rigid body 15 is applied a covering 16 of high-friction material designed to form the support surface for the objects to be conveyed on the belt. The covering 16 is made up in two parts for each modular member as shown in the figures but could be realized in a single piece or several parts. The material used for realizing the covering 16 could be a malleable material with high deformability and with behavior similar for example to rubber or elastomer.

In accordance with this invention the covering 16 is hot-molded on the rigid body 15 of the link. It is noted however that the high-friction malleable materials used for forming the covering 16 are incompatible with the materials used for molding the rigid body 15. By 'incompatible' is meant that the two materials do not bind with each other with heat treatment or welding (ultrasonic or thermal). Therefore, on the upper face of the rigid body 15 are made multiple projections (indicated by reference numbers 19, 20, 21, 22, 23, 24) over which is molded the malleable material forming the covering 16. At the time of hot molding of the covering 16 the projections are deformed plastically due to the effect of the heat transmitted by the malleable material that strikes them at high temperature.

The deformation takes place if the temperature of the malleable material during injection is higher than the softening temperature of the rigid material forming the body 15 of the link. The speed of the injection step carried out in accordance with the prior art, and the relationship between the mass of malleable material 16 and the mass of the rigid material of the body 15 are such that the thin projections 19 are subject to softening and major deformation due to the viscous friction with the injected mass while the body 15 of the link with flat continuous surface does not undergo appreciable deformation or alteration.

Deformation entails formation of undercut members that remain incorporated in the material forming the covering 16 allowing realization of a mechanical interconnection between the rigid body 15 and the covering 16.

FIG. 2 shows partially the rigid body 15 of a modular member of the conveyor before molding of the covering 16. From the upper face of the rigid body 15 extend two thin ribbings 19 parallel to the greater extension of the modular member. Opposite each interconnection arm 17 is made another projection 20, 21, 22, 23, 24 that extends transversely to the ribbing 19 in the direction of the corresponding interconnection arm 17. This procedure allows improving the anchorage of each portion of the covering 16 and in particular if the latter is shaped to extend at least partly above the interconnection arms 17.

A small cylinder 60 is made opposite the point of injection of the malleable material. The cylinder 60 has the function of breaking the flow of the malleable material injection to allow directing this flow toward all the projections to be deformed without the molten malleable material remaining still too long near the point of injection to cause formation of a cavity in the rigid body at that point.

The rigid body 15 can also include one or more through holes 30 (FIG. 2 shows two of them). These holes 30 in one embodiment of this invention are realized opposite projections 20 and 24 and are designed to be filled with malleable material when it is molded on the rigid body 15.

FIG. 3 shows a cross section of the rigid body 15 along the surface III—III (shown in FIG. 2). In said figure the rigid body 15 is shown before the covering 16 is molded on it. It is noted in particular how the ribbing 19 and the projections 22, 23 extend vertically from the rigid body 15. This procedure allows realizing the molding of the rigid part in a simple and economical manner with no need of using costly and sophisticated molds for formation of the undercuts. In addition, by deforming the ribbings starting from their vertical position the undercuts necessary for realizing the desired mechanical interconnection between the rigid body 15 and the skidproof covering 16 are easily obtained.

Advantageously the height of the ribbing 19 is greater than their thickness in order to favor formation of the undercuts when the latter are formed. For example, the ribbings 19 could be higher than 1 mm with thickness a few tenths of a mm.

Also note in FIG. 3 the teeth 31 formed in one piece with the rigid body 15 of the modular member and designed to engage for example with a rail guide of the conveyor belt (not shown in the figures). Notice also the holes 25 made in the arms 17 and designed to receive the adjacent link interconnection pins in accordance with what was stated above.

FIG. 4 shows a conveyor link cross-sectioned in the same manner as in FIG. 3 after the covering 16 has been hot-molded on the rigid body 15. Due to the effect of the heat spreading from the malleable material at the time of molding of the covering 16 the projection 22 and the ribbings 19 reach a temperature at which they are plastically deformable. The projections are struck by the flow of malleable material and being made deformable by the high temperature they deviate from the vertical portion to form undercut seats 40. The malleable material forming the covering 16 engages in the seats 40 and once cooled remains mechanically interconnected with the rigid body 15 of the modular member. It is noted that the rigid body 15 remains nearly undeformed because its mass (and consequently its thermal inertia) is much higher than that of the ribbings and the projections. In this manner, firm and safe anchorage of the covering 16 is realized without noticeably altering the dimensional characteristics and the form of the modular member.

It is also noted that in FIG. 4. that the through hole 30 is filled with malleable material during molding of the latter. This procedure allows further improvement of the anchorage of the covering 16 to the rigid body 15 of the modular member.

Figure 7:
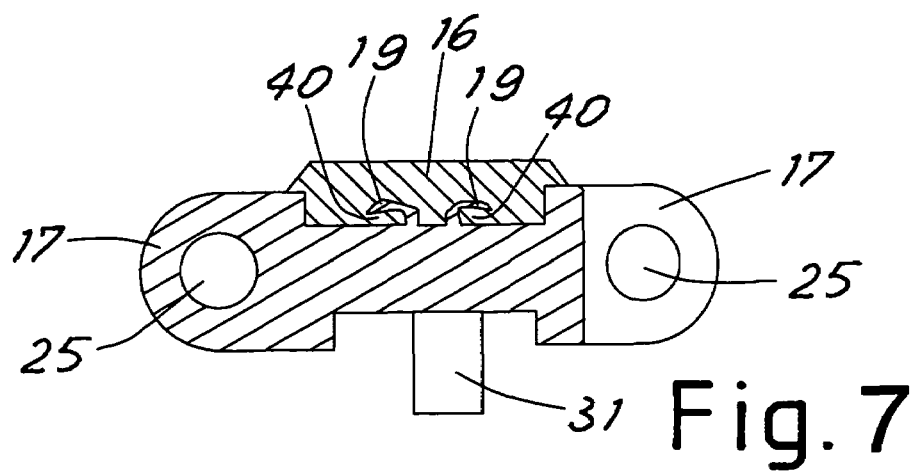
FIG. 7 shows a view of the link cross-sectioned along plane of cut V—V of FIG. 2 after molding of the skidproof covering.

FIGS. 5 and 7 show two views of the modular member 11 cross-sectioned along plane of cut V—V of FIG. 2 respectively before and after molding of the covering 16. FIG. 7 shows well the possible deformations undergone by the two ribbings 19 during hot molding of the portion 16.

Figure 6:
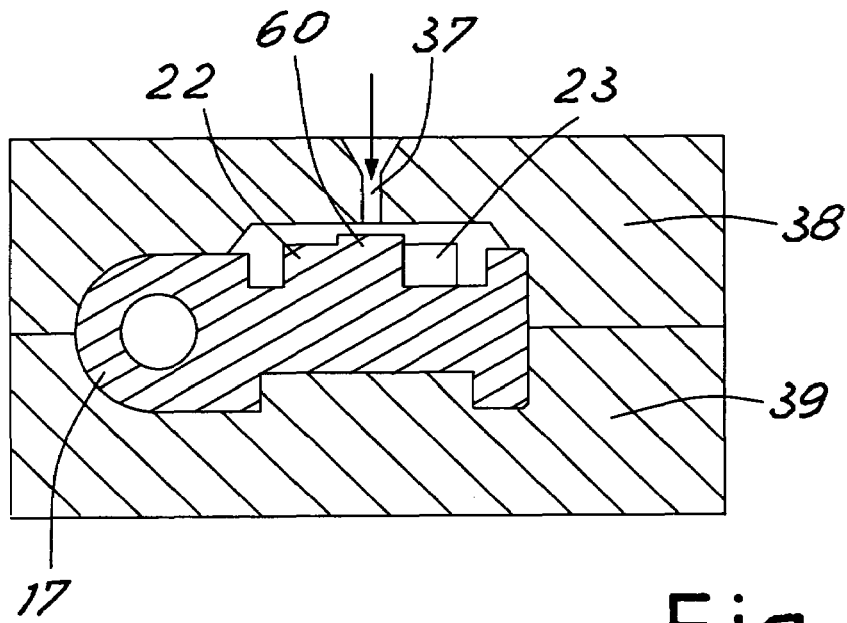
FIG. 6 shows a view of the link at the beginning of the molding step of the skidproof covering material in cross section along plane of cut VI—VI of FIG. 2.

FIG. 6 shows a link of the conveyor cross-sectioned along plane of cut VI—VI of FIG. 2 and inserted in the mold just before molding of the covering 16 of high friction material. It is noted advantageously that the lower half of the mold 39 could be the same part used for molding of the rigid body 15 of the link. This procedure allows hastening the manufacturing process of the conveyor modular member because it is sufficient to replace the upper half of the mold to proceed with molding of the portion 16 without ever removing the rigid body 15 of the lower half of the mold 39 and merely leaving it to cool before proceeding to the following molding at least below the softening temperature of the material.

In FIG. 6 the upper half of the mold 38 has already been applied for molding of the covering 16. Note that the injection channel 37 of the malleable material is arranged in such a manner as to cause the material to flow in temperature opposite the cylinder 60. Advantageously, the cylinder 60 can project slightly above the ribbings 19 to reduce the cross section of the flow of malleable material between the wall of the mold and the cylinder 60. This procedure allows increasing the speed at which the flow of malleable material strikes the projections to be deformed. The injection flow is therefore shunted immediately towards the ribbings 19 that heat up until they become plastically deformable. Being struck by the flow of malleable material the ribbings 19 deviate from their vertical position until they form the undercuts 40 shown in FIG. 7. It is noted that the flow of malleable material from the center outward can lead to the formation of two undercuts turned in opposite directions as shown. However, in the zones furthest from the injection channel 37 the flows of malleable material could be different to give origin to a chaotic and irregular deformation of the projections of the rigid body of the link. In any case, the mechanical interconnection that was just created between the two materials is such as to ensure a firm and lasting fastening of the covering 16 to the rigid body 15 of the conveyor link member.

It is now clear that the preset purposes have been achieved.

In particular, a conveyor having a skidproof supporting surface whose members can be made rapidly and economically is realized. Indeed, the material forming the skidproof covering is molded directly on the rigid body of the modular member with no need of using any supplementary structure on which is molded the rubber to then be fastened to the link body. In addition, the mold used to make the rigid body of the modular member is very simple and economical because the initial form of the body does not call for any undercut. Indeed, the undercuts are formed only at the time of molding of the covering of malleable material.

It is noted that the modular member in accordance with this invention can be made without ever removing the piece in work from the lower part of the mold by merely replacing the upper half of the mold to mold the covering of malleable material. This procedure allows considerably accelerating the manufacturing process of the conveyor links.

In addition, a conveyor ensuring firm and constant anchoring of the skidproof portion to the support surface for the objects is realized. Indeed, the mechanical interconnection between the rigid thermoplastic material and the malleable material forming the skidproof covering ensures a steady fastening between the rigid part and the surface covering supporting the modular member.

Naturally the above description of an embodiment applying the innovative principles of this invention is given by way of non-limiting example of said principles within the scope of the exclusive right claimed here.

For example, the projections designed to be deformed at the time of molding of the skidproof covering could have various initial forms and not necessarily those described above.

What is claimed is:

1. Method for manufacture of links designed to be interconnected to form a conveyor and including the following steps;
   mold a body of the link of rigid low-friction material with said body being provided with projections protruding from one of its faces, and
   hot-mold on at least part of said face cooled to hardening a high-friction malleable material for formation of a skidproof covering with the high-friction material during molding striking said projections and being injected at a temperature higher than the softening temperature of the rigid material in such a manner as to cause plastic deformation of the projections that originates undercuts with the deformed projections upon completed molding remaining incorporated in the high-friction material to create a mechanical interconnection between the covering and the rigid body.

2. Method in accordance with claim 1 characterized in that said projections project orthogonally from the face of the rigid body before the covering is hot-molded thereon.

3. Method in accordance with claim 1 characterized in that said projections include ribbings which are thin compared with the characteristic dimensions of the rigid body of the link.

4. Method in accordance with claim 3 characterized in that said ribbings have a height greater than their thickness before the skidproof covering is molded thereon.

5. Method in accordance with claim 3 characterized in that said ribbings have a height more that 1 mm before molding of the covering.

6. Method in accordance with claim 3 characterized in that the link is elongated and said ribbings are two in number and extend parallel to the greater extension of the link.

7. Method in accordance with claim 6 characterized in that a point of injection of the high-friction material at the moment of molding of the covering falls between the two ribbings.

8. Method in accordance with claim 1 characterized in that said rigid body includes at least one hole designed to be filled with the high-friction material at the moment of molding of the covering.

9. Method in accordance with claim 1 characterized in that opposite a point of injection for molding of the malleable material there is formed a cylindrical projection that extends from the rigid body to break the injection flow and shunt it towards the ribbings to be deformed.

10. Conveyor including an indefinite sequence of links interconnected together including a body of rigid low-friction material to which is applied a covering of more malleable high-friction material to form a supporting surface for the objects conveyed and characterized in that the covering is hot-molded on one face of the rigid body from which project projections with said projections, when struck by the high-friction material at melting temperature higher than the softening temperature of the rigid material, being deformed irregularly to form undercut members that are incorporated by the high-friction material to create a mechanical interconnection between the covering and the rigid body of the link.

11. Conveyor in accordance with claim 10 characterized in that said link is elongated and said projections include two ribbings oriented parallel to the longer extension of the link.

12. Conveyor in accordance with claim 11 characterized in that a plurality of additional projections are formed transversal to said ribbings with each arranged at the height of an interconnection arm between adjacent links.

13. Conveyor in accordance with claim 10 characterized in that the rigid body includes holes filled with the high-friction material at the time of molding of the covering.

14. Conveyor in accordance with claim 12 characterized in that the rigid body includes holes filled with the high-friction material at the time of molding of the covering and said holes are made opposite said transversal projections.

* * * * *